(12) United States Patent
Morris et al.

(10) Patent No.: US 11,347,467 B2
(45) Date of Patent: May 31, 2022

(54) REAL TIME COLLABORATION OVER MULTIPLE LOCATIONS

(71) Applicant: T1V, INC., Charlotte, NC (US)

(72) Inventors: James E. Morris, Lake Wylie, SC (US); Michael R. Feldman, Charlotte, NC (US)

(73) Assignee: T1V, INC., Charlotte, NC (US)

( * ) Notice: Subject to any disclaimer, the term of this patent is extended or adjusted under 35 U.S.C. 154(b) by 0 days.

(21) Appl. No.: 16/431,433

(22) Filed: Jun. 4, 2019

(65) Prior Publication Data

US 2019/0347061 A1    Nov. 14, 2019

Related U.S. Application Data

(63) Continuation-in-part of application No. PCT/US2017/064525, filed on Dec. 4, 2017.
(Continued)

(51) Int. Cl.
| | |
|---|---|
| *G06F 3/048* | (2013.01) |
| *G06F 3/14* | (2006.01) |
| *G06F 9/451* | (2018.01) |
| *G06F 3/147* | (2006.01) |
| *G06Q 10/10* | (2012.01) |
| *G09G 5/14* | (2006.01) |

(Continued)

(52) U.S. Cl.
CPC ............ *G06F 3/1454* (2013.01); *G06F 3/147* (2013.01); *G06F 3/1431* (2013.01); *G06F 9/452* (2018.02); *G06Q 10/101* (2013.01); *G09G 5/14* (2013.01); *H04L 65/403* (2013.01); *H04L 65/4015* (2013.01); *G09G 2360/04* (2013.01)

(58) Field of Classification Search
None
See application file for complete search history.

(56) References Cited

U.S. PATENT DOCUMENTS

| | | | |
|---|---|---|---|
| 2013/0307920 A1* | 11/2013 | Cahill | H04N 5/265 348/14.03 |
| 2015/0095822 A1 | 4/2015 | Feis et al. | |

(Continued)

OTHER PUBLICATIONS

International Search Report and Written Opinion dated Feb. 2, 2018 for PCT/US2017/064525.
(Continued)

*Primary Examiner* — William C Trapanese
(74) *Attorney, Agent, or Firm* — Xsensus LLP

(57) ABSTRACT

A method of collaborating between a first display computer associated with a first display at a first location and a second display computer associated with a second display at a second location includes establishing a connection between the first and second display computers, opening a virtual canvas to be shared by the first and second display computers, the virtual canvas to be displayed on the first and second displays simultaneously, and sending an object between the first and second display computers by sending data associated with the object on the virtual canvas stored on the first display computer from the first display computer to the second display computer to be stored locally, thereby creating a shared canvas, wherein objects are at a single location on the shared canvas, and objects on the shared canvas can be manipulated from both the first and second display computers simultaneously.

14 Claims, 9 Drawing Sheets

Related U.S. Application Data

(60) Provisional application No. 62/430,235, filed on Dec. 5, 2016.

(51) Int. Cl.
  *H04L 65/401* (2022.01)
  *H04L 65/403* (2022.01)

(56) References Cited

U.S. PATENT DOCUMENTS

| | | | |
|---|---|---|---|
| 2015/0350737 A1* | 12/2015 | Anderson | H04N 21/478 348/564 |
| 2016/0085381 A1* | 3/2016 | Parker | G06F 3/1454 715/753 |
| 2016/0119388 A1* | 4/2016 | Sitrick | G06F 40/169 715/753 |
| 2016/0328114 A1 | 11/2016 | Santhakumar et al. | |
| 2017/0330150 A1* | 11/2017 | Foley | G06Q 10/101 |

OTHER PUBLICATIONS

Extended European Search Report dated Aug. 13, 2021, in corresponding European Patent Application No. 17879181.0.

\* cited by examiner

REAL TIME COLLABORATION OVER MULTIPLE LOCATIONS

CROSS-REFERENCE TO RELATED APPLICATION

The present application is a Continuation in Part of PCT/US2017/064525 filed on Dec. 4, 2017, which claims priority under 35 U.S.C. § 119(e) to U.S. Provisional Application No. 62/430,235, filed on Dec. 5, 2016; both of which are entitled: "Real Time Collaboration over Multiple Locations," and both of which is incorporated herein by reference in their entirety.

DESCRIPTION OF RELATED ART

There are currently different solutions to collaborating over multiple locations. Web-based conferencing mirrors an entire screen of a first computer to the screen of other computers. The web-based conferencing software allows any of the computers connected to be the "presenter." All of the other users connected can view the presenter's screen on their computer. However, there is the limitation that there is only one presenter who is mirroring their display at a time. The computer of the presenter sends the whole screen to the other computers at a refresh rate, i.e., streams the entire screen to a screen at another location.

Cloud based collaboration tools host a session on a cloud server and provide a link that client computers use to log in to the session on the cloud server. Multiple documents can be uploaded into the canvas of session on the cloud server and then viewed and/or downloaded by any client computers connected to the session. Each location in a session can then use an application to edit a document or file in the session directly on the cloud server. While more than one location may edit the content in the session at a time, when something is being changed on a screen at one location, the computer at that location waits until the action is finished and then sends the information to the cloud server. A host session can open a canvas that is much larger than an individual screen. Each user at each location that joins the session can edit documents on the canvas.

For example, a user can perform a move or resize gesture on a window. After the gesture is complete, then the new size or location of the window is sent to the cloud server and the window is updated and sent to all locations. If an annotation, e.g., a line or circle, is drawn, once completed, i.e., a finger or stylus is lifted from the display, then this info is sent to the cloud server and the drawn image is stored on the canvas on the cloud server. For example, if a user at one location has a powerpoint file that they would like to share, they first upload the powerpoint file to the cloud. Then all of the slides in the powerpoint file are converted to a useable file format, stored in the cloud, and are then available for viewing from other locations. While everything is accessible in the cloud at any time in different time zones, e.g., asynchronous collaboration, when real time collaboration is desired, this may not be sufficient. Further, while these solutions may function well for many file types, live video feeds are not handled by this solution.

SUMMARY

A method of collaborating between a first display computer associated with first display at a first location and a second display computer associated with a second display at a second location, may include establishing a connection between the first and second display computers, opening a virtual canvas to be shared by the first and second display computers, the virtual canvas to be displayed on the first and second displays simultaneously, and sending an object between the first and second display computers by sending data associated with the object on the virtual canvas stored on the first display computer from the first display computer to the second display computer to be stored locally, thereby creating a shared canvas. Objects may be at a single location on the shared canvas. Objects on the shared canvas may be manipulated from both the first and second display computers simultaneously.

Sending an object may be through a peer to peer connection, and may include sending a data file stored on a host computer to a non-host computer and then storing it on the non-host computer, streaming live video from a host computer to a non-host computer, and sending data regarding a change associated with the data or the live video from a change host computer to a change non-host computer.

When a display resolution of a window in a video non-host display is less than a display resolution of a video host display, the method may include sending information regarding the display resolution of the window from the video non-host computer to the video host computer, and downsampling the video by the video host computer in accordance with the display resolution from the video non-host computer.

When the object is a file, the method includes storing the object on the second display computer. After storing the object, the method may only send information regarding changes to the object on either of the first and second displays from a corresponding computer to the other computer.

When the object is a live video stream, the object may be streamed directly from the first display to the second display. When a display resolution of a window in the second display streaming the live video is smaller than a display resolution of the first display, the method may include sending information regarding the display resolution of the window from the second display computer to the first display computer, and downsampling the video by the first display computer in accordance with the display resolution from the first display computer. The method may include sending information regarding changes on top of the live video stream on either of the first and second displays from a corresponding computer to the other computer.

Sending the object may include using a cloud server as a relay.

Before sending the object from the first display computer to the second display computer, the method may include connecting a mobile device to the first display computer, and storing or streaming the object from the mobile device to the first display computer. Altering the object may be performed on any of the mobile device, the first display computer, and the second display computer.

Changing a view of the shared canvas on one display may not alter a view of the shared canvas on another display.

Changing a view of the shared canvas on one display may change a view of the shared canvas on another display.

When a display resolution of the object in the first display and the second display are less than a full resolution of the object on the mobile device, the method may include sending information regarding a highest resolution of the object in a display computer in the session to the first computer; sending information regarding the highest resolution of the object to the mobile device; downsampling the object by the mobile device in accordance with the highest resolution; and sending the downsampled object from the mobile device to the first display computer.

The method may include sending another object between the first and second display computers by sending data associated with another object on the virtual canvas stored on the second display computer from the second display computer to the first display computer to be stored locally.

BRIEF DESCRIPTION OF THE DRAWINGS

Features will become apparent to those of skill in the art by describing in detail exemplary embodiments with reference to the attached drawings in which FIGS. 1 to 3. 4A, 4B, and 5 to 8 illustrate a display system in accordance with embodiments at different stages of operation.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Figure 1:
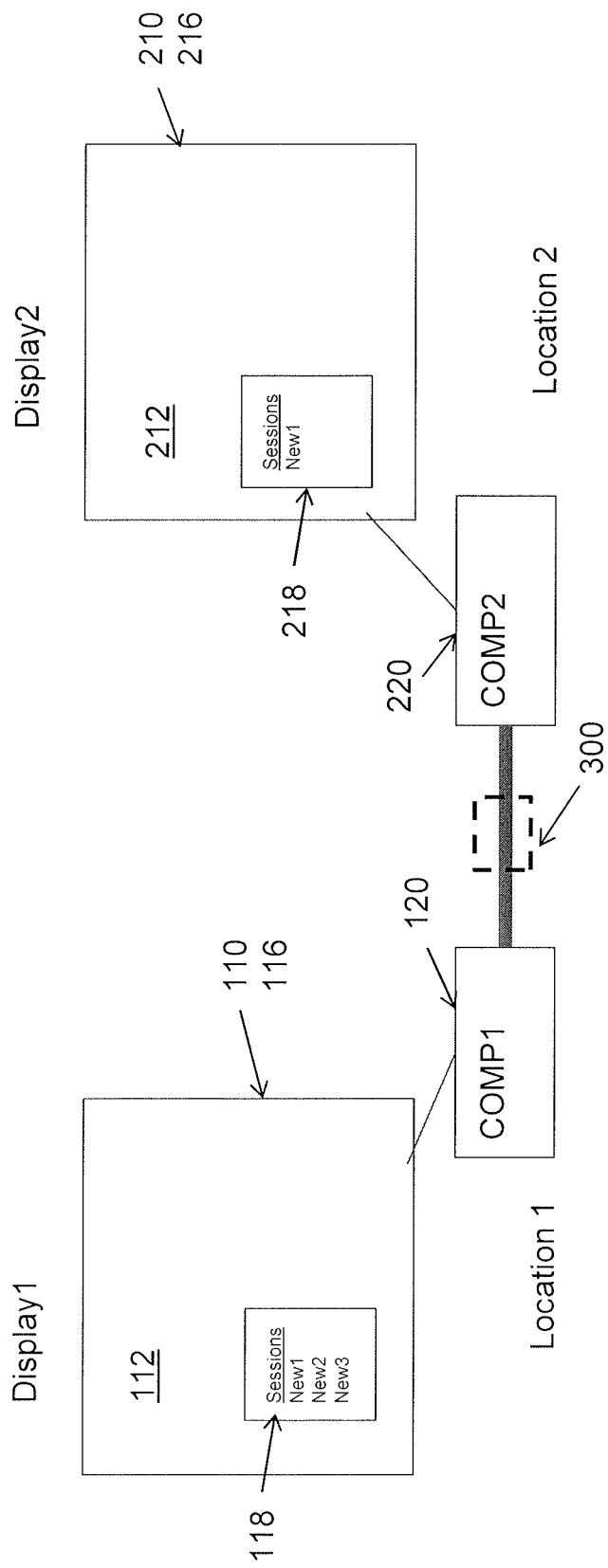

As illustrated in FIG. 1, when operating at multiple locations, here illustrated as two for simplicity, when the screen on the displays is treated as a virtual canvas, rather than an entire screen, as disclosed, for example, in U.S. Pat. No. 9,596,319, issued on Mar. 14, 2017, which is hereby incorporated by reference for all purposes, individual objects or windows on the virtual canvas on a display Display1 110 at a first location Location 1 running on a first computer COMP1 120 may be transferred to a second computer COMP2 220 associated with a display Display2 210 at a second location Location 2 to be displayed on a virtual canvas on the display Display2 210, and vice versa. Instead of storing the objects or windows in the cloud, a shared canvas may be established to be accessed by both computers COMP1 120 and COMP2 220 running the displays using the virtual canvas software noted below and the objects can be transferred directly, e.g., using a peer-to-peer connection. This peer-to-peer connection may be established through a relay server, e.g., in the cloud, which does not store anything, but just relays that data or the connection may be direct peer-to-peer without going through a relay server.

As used herein, peer-to-peer connection means that the computers forming the peer-to-peer connection communicate with each other, either directly or through a relay server 300. When the relay server 300 is used, the relay server 300 just relays data in real time to facilitate the communication, but does not rely on storing data to transfer information. In contrast, in cloud-based communication protocol, each local computer communicates information to a cloud-based server. The cloud-based server has the master information or the master canvas and all objects on the canvas. Periodically, each local computer requests from the cloud server if any changes have been made to the master canvas and if so, a synchronization occurs between the local computer and the cloud server.

In accordance with embodiments, initially a virtual session is started at a first location, with a computer, e.g., Comp1 120 or Comp2 220, that is running virtual canvas software, e.g., ThinkHub® multi-site software by TIV®. In particular, a virtual canvas that exists within the software that may be much larger than the physical display region 112, 212 on Display1 110, 210. Any section of the virtual canvas can be viewed on the display region 112, 212 of the Display1 110, 210. Suppose that at first the entire virtual canvas is viewed on the display region 112, 212 and that each of the displays 110, 210 include a touch or gesture sensor 116, 216 associated therewith. Then by zooming into regions, a portion of the virtual canvas can be viewed. By pinching, zooming and panning with gestures detected by the touch sensor 116, 216, a user can zoom into various regions of the virtual canvas to be shown on the display region 112, 212.

The virtual canvas is a virtual region that expands to greater than the physical area of the display regions 112, 212, e.g., any number of times the physical area up to infinite. The use of the virtual canvas allows additional files to be accessible and can be saved, but off the display regions 112 212. Gestures, such as pan, zoom and pinch gestures can be made to move and resize the scale of the virtual canvas, allowing the full canvas to be displayed all at once or only a small section thereof.

Figure 2:
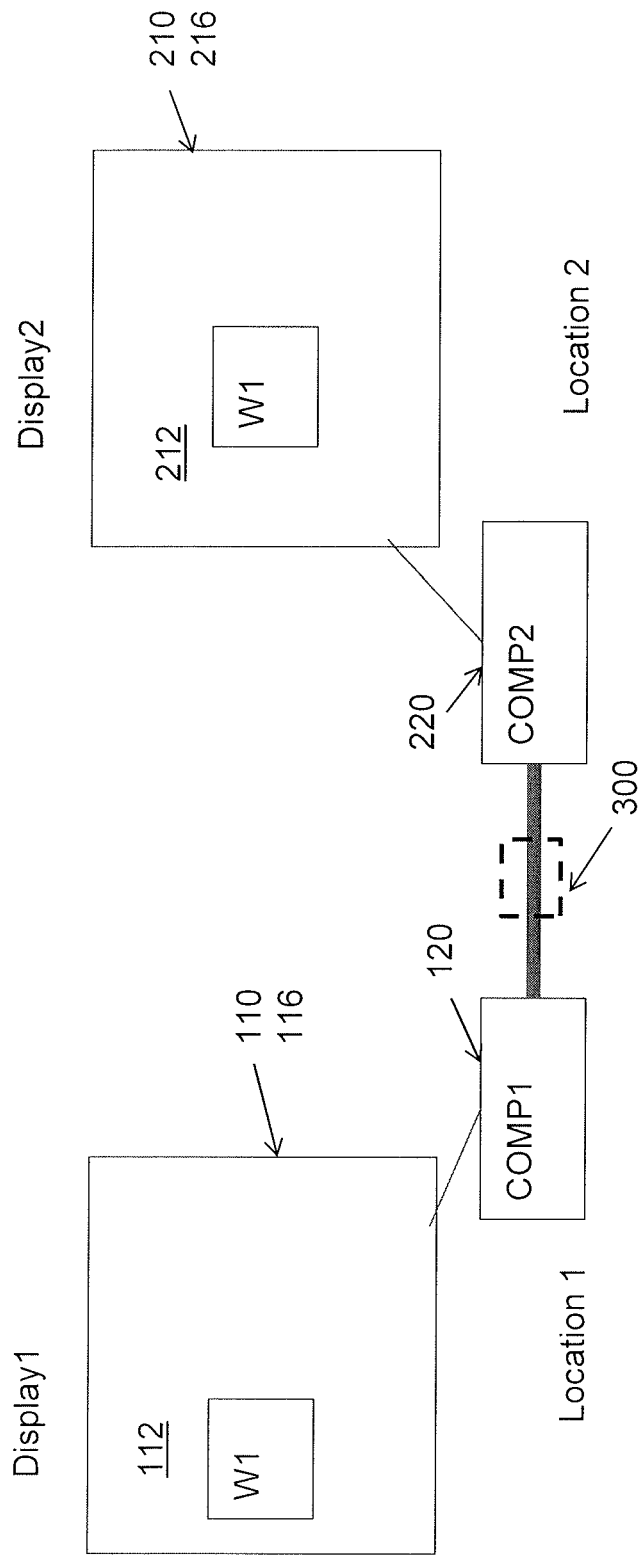
Figure 3:
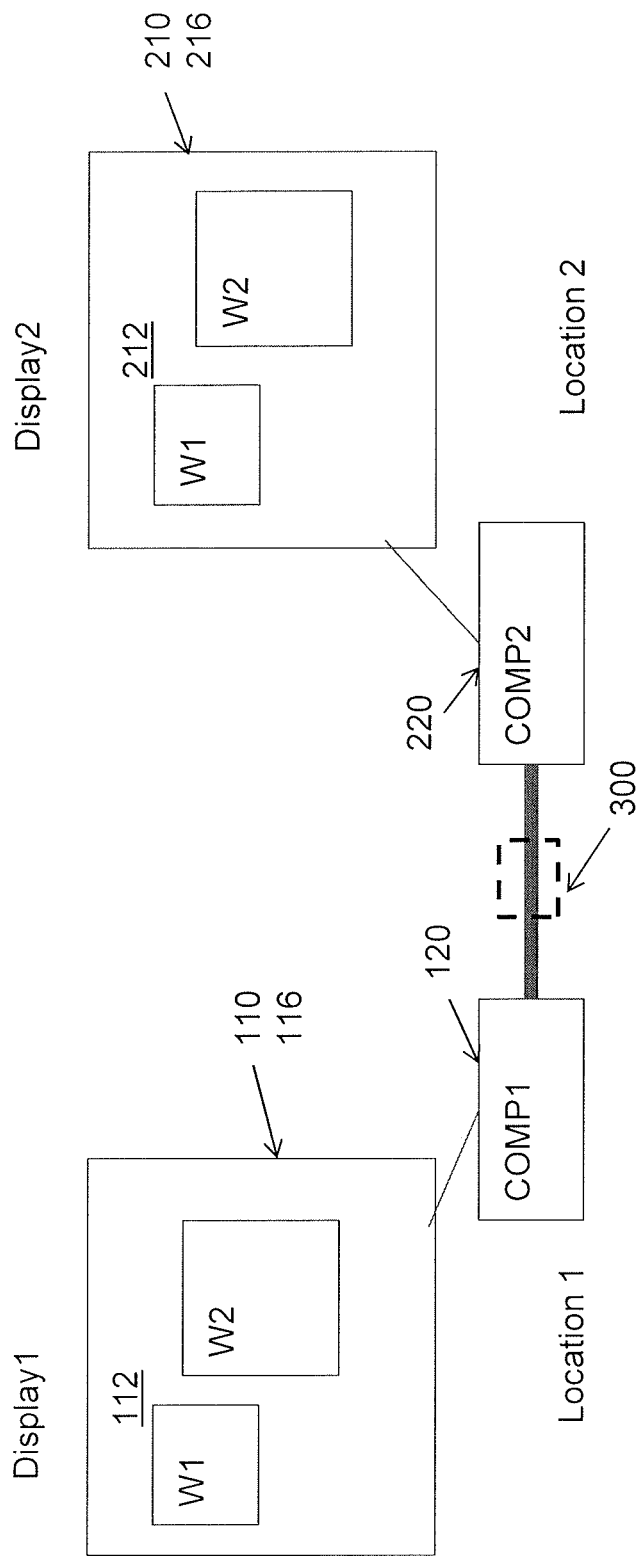

After connection is established, then a user, e.g., at Comp1 120 starts a multisite session and gives it a name, e.g., New1, as may be seen in a window 118 on Display1 110. Then, a user at a second location with a computer, e.g., Comp2 220, that is also running the virtual canvas software can see a list of active multisite sessions that it has permission to access, e.g., New1 as shown in window 218 on Display2 210. Then, the user at the second location taps on a button or on the name in the list on the virtual canvas to join the session. Once the second computer joins the session, the connection is established between Comp1 and Comp2, and the data for all the objects on Comp1 in the virtual canvas is then sent to Comp2, and vice versa, such that the virtual canvas is now a shared canvas. For example, as shown in FIG. 2, when a window W1 is opened in Display1 at Location 1, the window W1 will also appear in Display2 at Location 2. Similarly, as shown in FIG. 3, when a window W2 is opened in Display2 at Location 2, the window W2 will also appear in Display2 at Location 2. From this point forward, any time a user on either computer (Comp1 or Comp2) enters any data onto the canvas or opens a new window, the entire data or window is transmitted to the other computer, so that at any time after the initial set-up all objects in either display are stored locally on both computers. Further, objects are at a single location on the shared canvas, and objects on the shared canvas can be manipulated from both the first and second display computers simultaneously.

While the above has shown the displays displaying the objects at the same locations on the two displays, this is true if the displays are both displaying the same views of the canvas. In other words, while the objects are at the same location on the canvas, different views of the canvas may be viewed on the different displays. For example, if Display2 were viewing the same general region of the virtual canvas, but with a different zoom factor and slightly different center point, then on Display2 W1and W2 would appear on the same places on the virtual canvas but different location on the Display and with different scale factors. Further, one display may be viewing a different portion of the shared canvas without altering the view on the other display. Alternatively, changing portions being viewed on one display may alter that view on the other display.

Figure 4A:
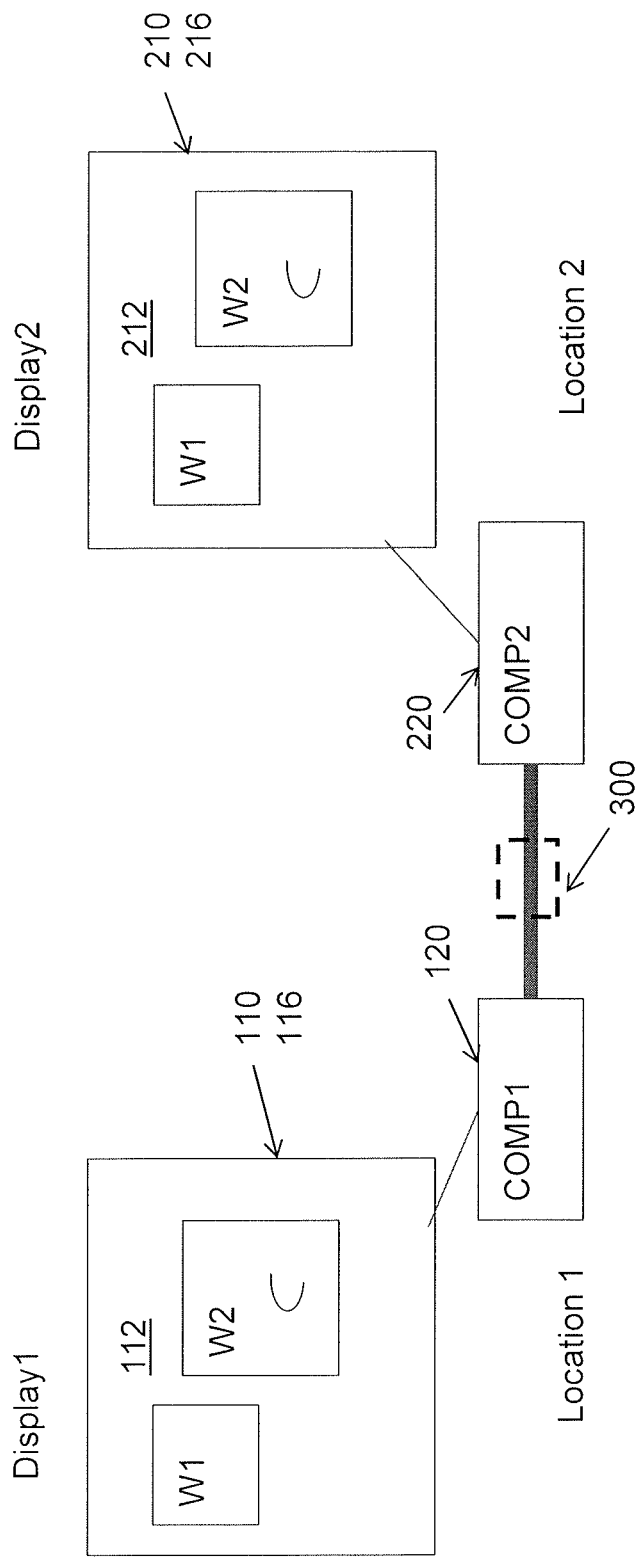
Figure 4B:
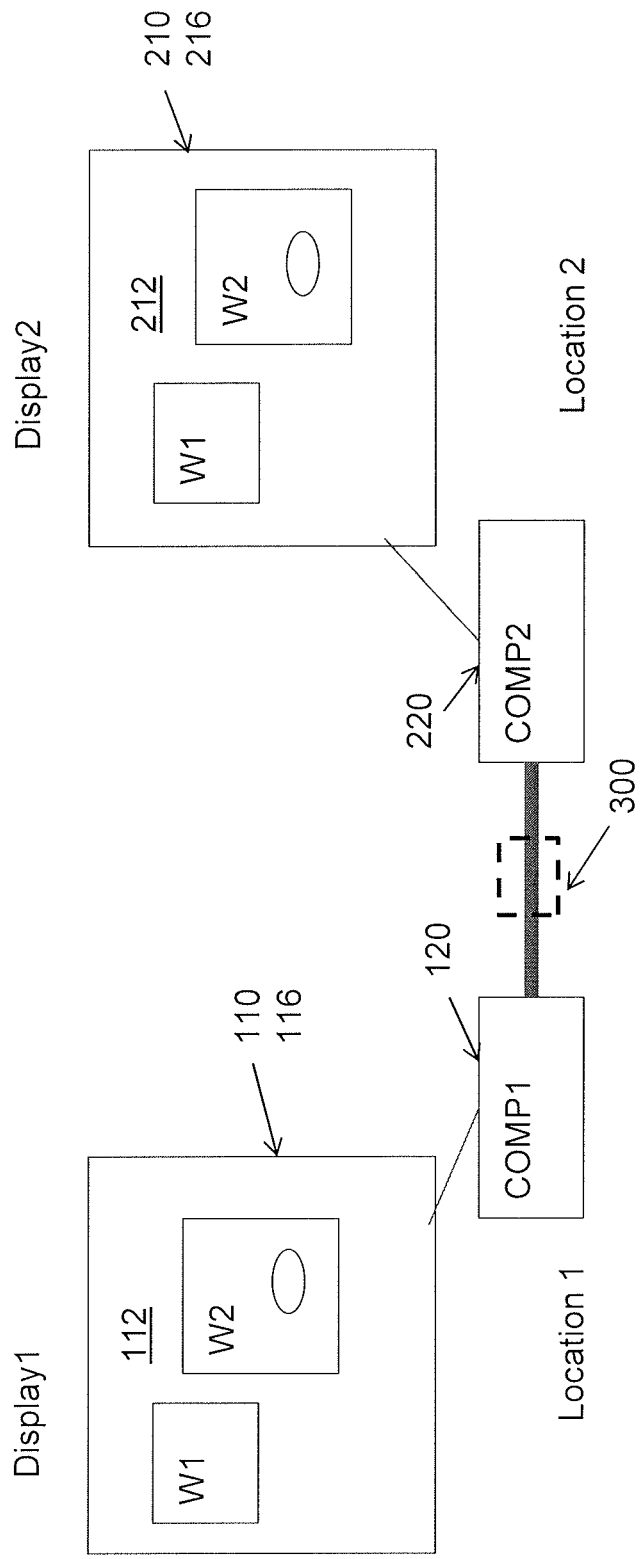

As each object is stored locally, when an action is performed on that object, e.g., annotation, resizing, moving, and so forth, only that data regarding the change is sent from the computer associated with the display on which the change has been made to the other computer(s) viewing that object. This allows very fast performance once the object has been initially stored, as only the changed data is communicated. Further, this allows the change to be illustrated in real time, e.g., the remote display will show the zoom or pinch rather than abruptly change the size or will show the annotation as it is being drawn, rather than once a line or character is completed. For annotation on an object, the drawing data can be sent from one location to another as the object is drawn. For example as illustrated in FIGS. 4A and 4B, if a user at one location annotates, e.g., draws an ellipse, in a window, e.g., the second window W2, the second window W2 will also show the annotation in FIG. 4A before the ellipse is completed, as shown in FIG. 4B. While annotations on either display will appear on the shared canvas, each display may independently view different portions of the shared canvas or portions being viewed by both displays may be synchronized to be the same.

In addition to sharing files, objects, live video streams or other data on computers at the first and second locations, data can also be shared from mobile devices. There are three methods by which data can be shared by mobile devices.

The first method includes sharing the contents of a display on a mobile device with Display1, Display2, or any display connected to a computer participating in a multi-site session ("Content Sharing"). When mobile device Content Sharing occurs, typically an application App is first downloaded to the mobile device (e.g. the T1V® AirConnect™ App, as set forth in U.S. patent application Ser. No. 15/184,814, filed on Jun. 16, 2016, and entitled "REMOTE GESTURE CONTROL, INPUT MONITOR, SYSTEMS INCLUDING THE SAME, AND ASSOCIATED METHODS", which is hereby incorporated by reference in its entirety for all purposes) or uses a sharing protocol built into the operating system (e.g., Airplay, Miracast, as set forth in U.S. application Ser. No. 15/056,787, filed Feb. 29, 2016, and entitled "SYSTEM FOR CONNECTING A MOBILE DEVICE AND A COMMON DISPLAY", which is incorporated by reference herein for all purposes). The App then digitizes the user's screen (the user of the mobile device) and transmits the digitized data to the Display Computer (e.g. Comp1) as a video stream. Then Comp1 then displays this video stream in a Live Video Window on Display1. This Live Video Window is then shared by streaming this data to any other computers connected to the multi-site session.

The second method is for objects to be transmitted from a mobile device to a Display Computer (e.g. Comp1). Once a connection is established between a mobile device and a Display Computer (e.g., as in a U.S. application Serial No. U.S. patent application Ser. No. 15/207,841 filed Jul. 12, 2016 and entitled "DISPLAY CAPABLE OF OBJECT RECOGNITION", which is incorporated by reference herein for all purposes) and if the mobile device has an application App downloaded (e.g., the AirConnect™ App), then the App can send a file for an object on the mobile device (e.g., a .pdf, a .jpg, a .ppt file) to the Display Computer. Alternatively, the mobile device can be connected by a hardline input. Once the Display Computer receives this file, it can display it as an object on the display and on the virtual canvas. This object would then be shared with any other computer connected to the Display Computer through a multi-site session, i.e., on the shared canvas.

The third method of interacting with a screen with a mobile device is to add additional capabilities to the App downloaded onto the mobile device. For example, the App could allow the user of the mobile device to view the canvas and use the inputs on the mobile device (e.g., via a mouse, a touchscreen, a touchpad, and so forth) to manipulate objects on the virtual canvas. If the App is used in this manner, then when a user of a mobile device moves an object on the virtual canvas, then the object is moved on all of the computers in the multi-site session viewing that canvas simultaneously.

Figure 5:
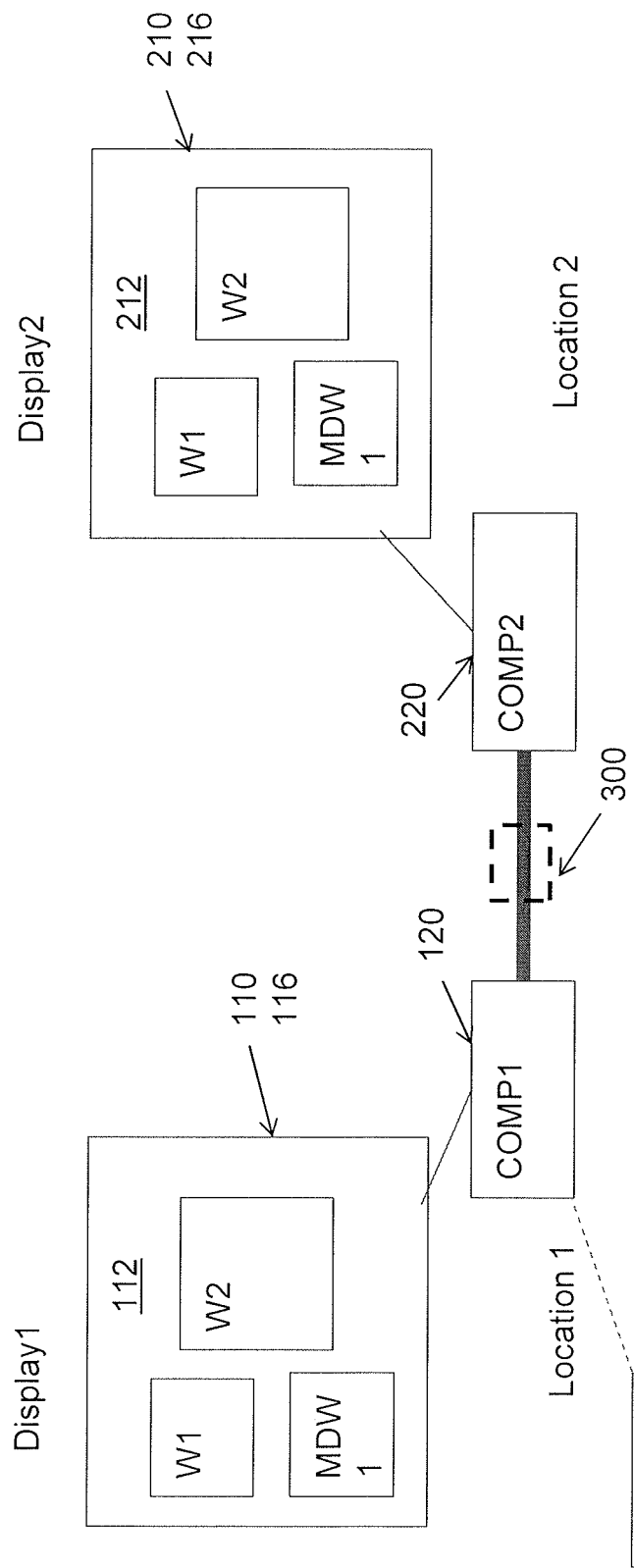

In all three of these methods, the mobile device MD first makes a connection to a single computer of all of the Display Computers in the multi-site session. This connection is typically made as discussed in any of the above referenced U.S. patent applications, through the use of a Key or IP address. Typically, if the user of the mobile device is in the same room as one of the Display Computers, they will see the key or IP address of that computer displayed on the Display and make the connection to that computer. It may then make a direct peer-to-peer connection to that computer, e.g., a wireless connection. However, the mobile device can make an initial connection to any of the computers in the multi-site session, depending on the Key or IP address entered. Once this initial peer-to-peer connection is made to one of the Display Computers, data can be shared from that computer to all other Display Computers in the multi-site session by the methods described above. When an object from the mobile device MD1 is displayed on the Display1 in a mobile device window MDW1, as shown in FIG. 5, the file is stored on Computer1 and in Computer2.

Figure 6:
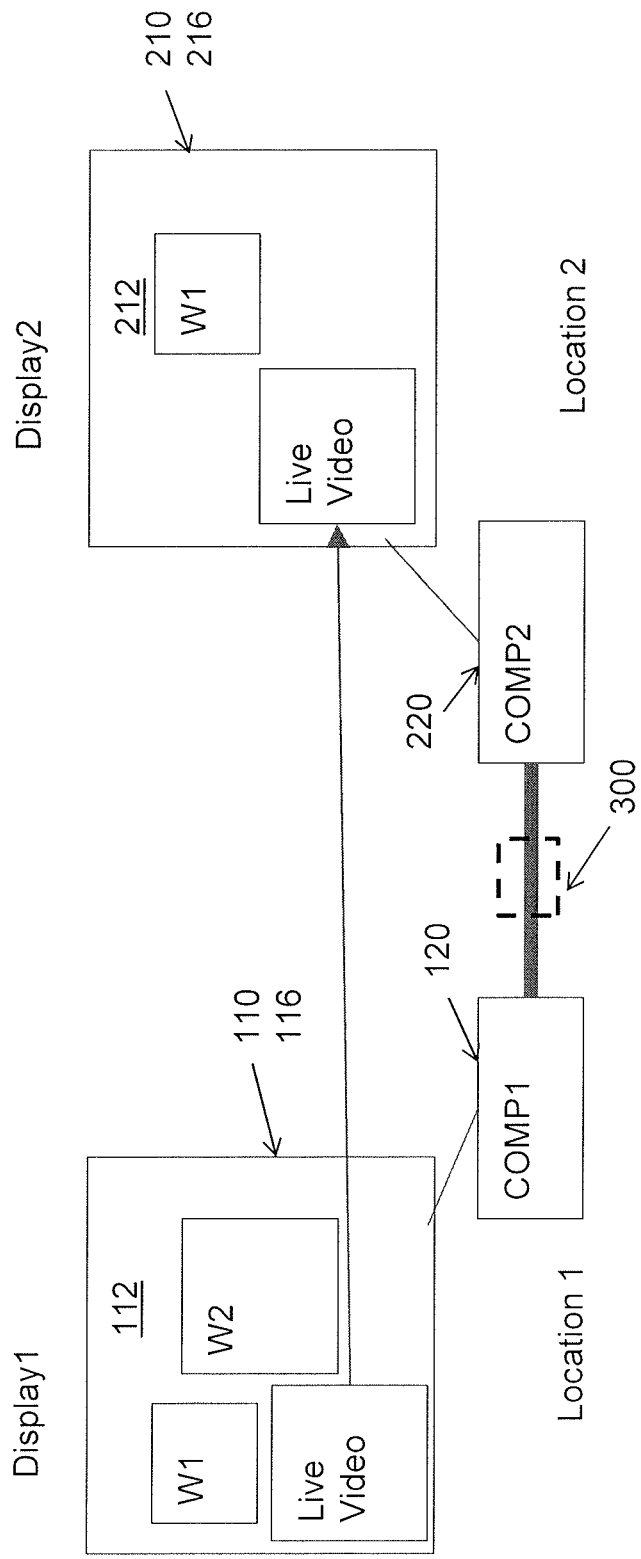
Figure 7:
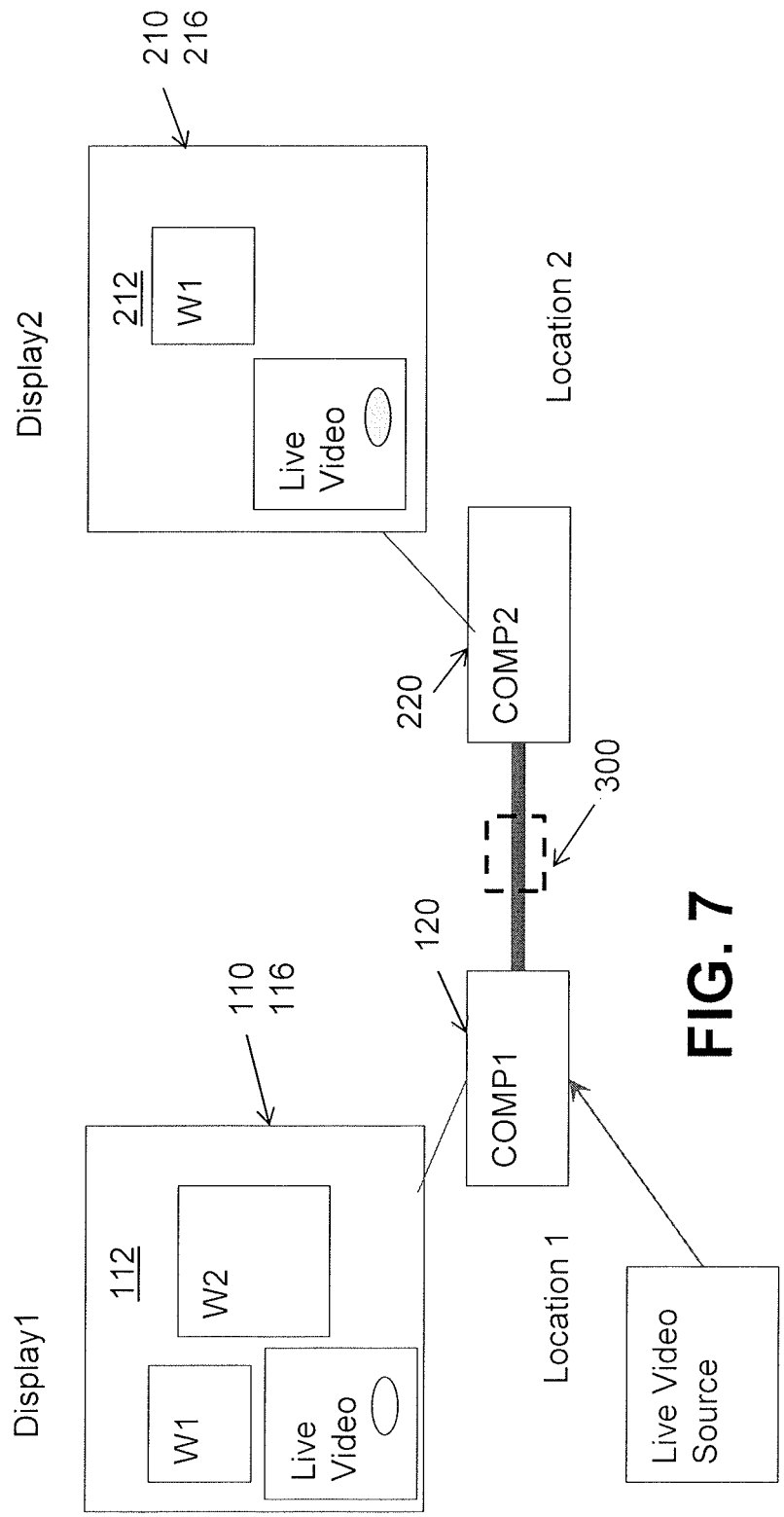

When the object is a live video window, data in the video window is streamed from a first location to the other multi-site locations, as shown in FIG. 6. This allows users in the various other locations to view the video in real time at the same time as the source location (i.e., real time video viewing with any inherent delay in the peer to peer connection). There is not a way to handle real time video viewing if the communication model is to store all objects in the cloud for a shared canvas, as the live video window is constantly changing. Further, users at either location may be annotating on the live video stream window, resizing and/or moving the live video stream, and so forth at the same time. For annotation, the annotation and drawing data is sent as separate layer from the video stream. Only the change in the data for the annotation of drawing is communicated as described above, so that the annotations and drawing can be updated in real time at both locations, even on top of a live video stream, as shown in FIG. 7. The live video source could be a camera, computer, a mobile device, video conferencing feed, and so forth. Similarly, for resizing or moving live video windows, this data is also communicated separately from the real time video stream. Note that this could not be achieved in conventional web-based conferencing methods, which transmit the entire screen from one location to another one. For example, with web based video conferencing one location only has "control" and is the "host," so that only the host can draw on the video feed. If both people were to draw on the live source at the same time, there is no way to distinguish which side should be transmitted to the other side, since the protocol is that the entire screen on one side is transmitted to the other.

In this manner, if, for example, at a host location, i.e., the location from which the video as being streamed, there is a large screen that contains a number of objects, including windows that contain live video and other windows that contain static data, the information on the entire screen can be shared from the host location to the other locations, by streaming the live video windows only and sending data only for the static data windows.

Figure 8:
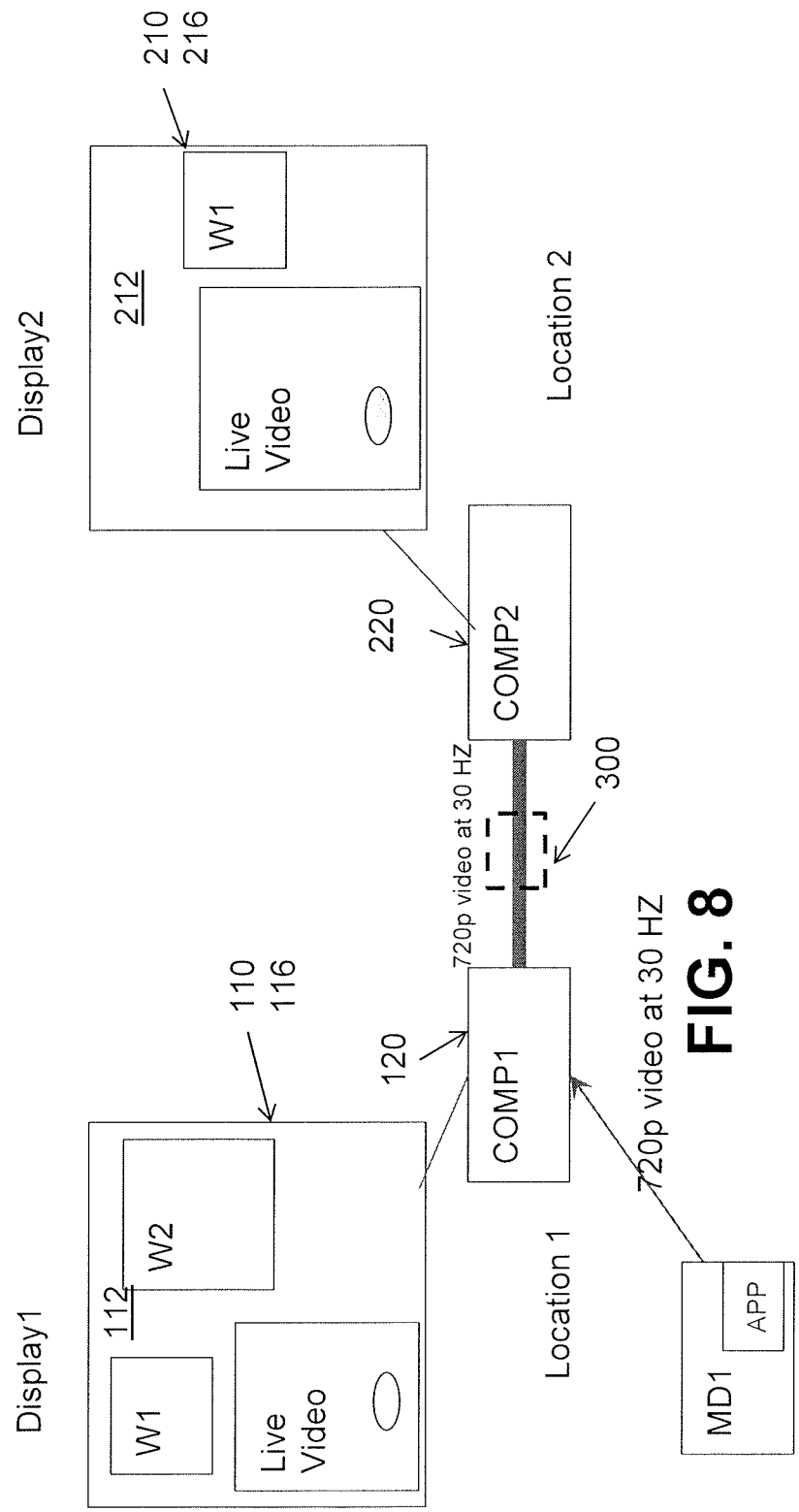

For further data reduction, down sampling (Dynamic Resolution Scaling (DRS)) may be used as disclosed in U.S. patent application Ser. No. 15/056,787, filed Feb. 29, 2016, which is hereby incorporated by reference. When streaming live video windows in the manner disclosed above the bandwidth required can be much larger than with conventional web-based or video conferencing. For example, suppose at location 1 there are six video sources connected to COMP1. Each of these may be place on the canvas and each may have a resolution of 1080p hd. Suppose that at location 1, DISPLAY1 has a resolution capable of displaying all six video sources simultaneously and the view of the canvas is such that all six video windows are displayed on DISPLAY1 at the same time in full 1080p HD. (That would mean that DISPLAY1 has resolution of at least 12 k). Normally, in web-based conferencing the source computer sends the entire resolution of the display because it has no information of how the content is being viewed on the receiving side. However, with ThinkHub® multi-site software, if at location 2, COMP2 has only a 4 k display, then, at most 4 k resolution would need to be transmitted. Suppose for example at location 2, the canvas is being zoomed in to a particular section of the canvas such that only 3 of the 6 videos are in view at a given time and these three videos are being displayed at 720p resolution. Then COMP2 can send data to COMP1 requesting that the three videos in view are sent at full frame rate but at a lower resolution (720p), as illustrated in FIG. 8. The three videos out of view can be sent at lower resolution and/or very low frame rate, for example 1 frame per 2 seconds. In this manner the total bandwidth can be reduced to lower than the size of the display at location 2. In this manner the bandwidth of the data transmitted can be reduced to the lower of (a) The resolution of the receiving display times the viewing frame rate;

(b) The combined resolution of all of the streaming video signals times the viewing frame rate; and (c) The combined resolution of all of the streaming video signals as displayed on the receiving display times the viewing frame rate.

The algorithm may be set to always lower the bandwidth to the lower of (b) and (c) above, which will mean that it will always be as low or lower than the lower of (a) and (b) above. Note that in the above analysis we neglected the bandwidth for the off-screen video signals, since they would be sent at such low frame rate that their bandwidth would be negligible.

In the method above, all the video sources send all info at full resolution to COMP1. Based on information received from the other computers in the multisite session on how the live video windows are being viewed thereon, COMP1 down samples the transmission to the other sites. In addition to this, COMP1 can also use this information to send info to the live video sources to downsample the video streams prior to sending the info to COMP1. In this situation a laptop would only send its full resolution signal if at least one computer in the multisite session was viewing that live signal and the laptop's full resolution or larger.

When the window having a video stream that is initially out of view, is then brought into view, something will still be shown in the window (e.g. the video at a very low frame rate) and then the computer COMP2 requests that the frame rate and bandwidth increase.

When a session is ended, each location can save the session separately, nothing on a display that has ended the session changes, but the screen is no longer updated.

In another alternative, as shown in FIG. 8, when the mobile device is running the AirConnect application (APP), rather than the COMP1 performing the downsampling, the mobile device may perform the downsampling. This downsampling may be performed in accordance with a largest resolution on any Common Display in the multisite session (e.g. Display1 and Display2 in FIG. 8). Suppose a Mobile Devices is sending a first live video stream to the multisite session. This first live video stream may appear in a window on one or multiple Common Displays. All Common Displays in the multisite session may send the resolutions of each of the windows for the first live video stream in the multisite session to the mobile device outputting the first live video stream and that mobile device then determines the highest resolution needed (Max Needed Resolution). The mobile device MD1 then sends the first live video stream to one Common Display Computer in the multisite Session (COMP1 in FIG. 8), e.g., the Common display computer at the location of the mobile device MD1 with the Max Needed Resolution. COMP1 then sends the first live video stream with the Max Needed Resolution to its associated display computer. COMP1 may then send the first live video stream to all other Common Display Computers in the multisite Session. For example, Display2 may be displaying the first live video at the Max Needed Resolution and sends this resolution to the display computer COMP1, which sends it to the mobile device. The mobile device then downsamples the live video in accordance with the Max Needed Resolution and sends the live video stream to the display computer COMP1 to send to the other displays in the session.

By way of summation and review, real time collaboration over multiple locations may be realized establishing a shared canvas between computers at different locations, sending all objects on the canvas between these computers. When the object is a file, this file may be stored at the non-host computers, and, when the object is a real time video stream, the video may be directly streamed to the non-host computers. As used herein, a host computer is to mean the computer on which the data is originally stored or received, the computer on which the stream originates, or the computer on which a change is made. Thus, each computer may be both a host computer and a non-host computer in any given session.

Embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of this disclosure.

The methods and processes described herein may be performed by code or instructions to be executed by a computer, processor, manager, or controller. Because the algorithms that form the basis of the methods (or operations of the computer, processor, or controller) are described in detail, the code or instructions for implementing the operations of the method embodiments may transform the computer, processor, or controller into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, or controller which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of collaborating between a first display computer associated with a first display at a first location and a second display computer associated with a second display at a second location, the method comprising:
    establishing a connection between the first and second display computers;
    opening a virtual canvas to be shared by the first and second display computers, the virtual canvas to be displayed on the first and second displays simultaneously, wherein either the first display computer or the second display computer may be a host computer for objects on the virtual canvas;
    sending a first object other than a live object from a host computer of the first object to a non-host computer by sending data associated with the first object on the virtual canvas stored on the host computer of the first object from the host computer of the first object to the non-host computer to be stored locally, thereby creating a shared canvas;
    storing the first object locally on the non-host computer;
    sending data associated with a second object that is a live object on the virtual canvas stored on a host computer of the second object from the host computer of the second object to the non-host computer to be stored locally; and
    streaming the second object from a host computer for the second object, wherein
    each of the first and second objects are at respective single locations on the shared canvas,
    a first view of the shared canvas is displayed on one of the first and second displays and a second view of the shared canvas is displayed on another one of the first and second displays, the first and second view being different views of the shared canvas, and
    each of the first and second objects on the shared canvas can be manipulated from either of the first and second display computers, wherein the manipulation includes resizing the object and moving the object and the manipulation is simultaneous on the first and second displays, and
    content of the second object is continuously synchronized with the host computer.

2. The method as claimed in claim 1, wherein sending an object is through a peer to peer connection.

3. The method as claimed in claim 2, wherein sending the object through the peer to peer connection includes:
    sending data regarding a change associated with the first or second object from a change host computer to a change non-host computer.

4. The method as claimed in claim 3, wherein, when a display resolution of a window in the non-host display for the second object is less than a display resolution of the host display for the second object, the method includes:
    sending information regarding the display resolution of the window from the non-host computer to the host computer; and
    downsampling the second object streamed by the host computer in accordance with the display resolution from the non-host computer.

5. The method as claimed in claim 1, wherein, after storing the object, only sending information regarding changes to the object on either of the first and second displays from a corresponding computer to the other computer.

6. The method as claimed in claim 1, wherein, the second object is streamed directly from the host display for the second object to the non-host display for the second object.

7. The method as claimed in claim 6, wherein, when a display resolution of a window in the non-host display for the second object is smaller than a display resolution of the host display for the second object, the method includes:
    sending information regarding the display resolution of the window from the non-host computer to the host computer for the second object; and
    downsampling the second object by the host computer in accordance with the display resolution from the non-host computer.

8. The method as claimed in claim 6, further including sending information regarding changes on top of the second object on either of the first and second displays from a corresponding computer to the other computer.

9. The method as claimed in claim 1, wherein sending the object includes using a cloud server as a relay.

10. The method as claimed in claim 1, wherein, before sending the object from the first display computer to the second display computer:
    connecting a mobile device to the first display computer; and
    storing or streaming the object from the mobile device to the first display computer.

11. The method as claimed in claim 10, wherein altering the object is performed on any of the mobile device, the first display computer, and the second display computer.

12. The method as claimed in claim 10, wherein, when a display resolution of the object in the first display and the second display are less than a full resolution of the object on the mobile device, the method includes:

sending information regarding a highest resolution of the object in a display computer in the session to the first display computer;

sending information regarding the highest resolution of the object to the mobile device;

downsampling the object by the mobile device in accordance with the highest resolution; and sending the downsampled object from the mobile device to the first display computer.

13. The method as claimed in claim 1, further comprising sending another object between the first and second display computers by sending data associated with another object on the virtual canvas stored on the second display computer from the second display computer to the first display computer to be stored locally.

14. A non-transitory computer readable storage device having computer readable instructions that when executed by circuitry cause the circuitry to:

establish a connection between a first display computer associated with a first display at a first location and a second display computer associated with a second display at a second location;

open a virtual canvas to be shared by the first and second display computers, the virtual canvas to be displayed on the first and second displays simultaneously, wherein either the first display computer or the second display computer may be a host computer for objects on the virtual canvas;

send a first object other than a live object from a host computer of the first object to a non-host computer by sending data associated with the first object on the virtual canvas stored on the host computer of the first object from the host computer of the first object to the non-host computer to be stored locally, thereby creating a shared canvas;

store the first object on the non-host computer;

send data associated with a second object that is a live object on the virtual canvas stored on a host computer of the second object from the host computer of the second object to the non-host computer to be stored locally; and stream the second object from the host computer for the second object, wherein each of the first and second objects are at respective single locations on the shared canvas, a first view of the shared canvas is displayed on one of the first and second displays and a second view of the shared canvas is displayed on another one of the first and second displays, the first and second view being different views of the shared canvas, and each of the first and second objects on the shared canvas can be manipulated from either of the first and second display computers, wherein the manipulation includes resizing the object and moving the object and the manipulation is simultaneous on the first and second displays, and content of the second object is continuously synchronized with the host computer for the second object.

* * * * *